Patented Mar. 26, 1929.

1,706,498

UNITED STATES PATENT OFFICE.

ROBERT EMANUEL SCHMIDT AND ROBERT BERLINER, OF ELBERFELD, GERMANY, ASSIGNORS TO GRASSELLI DYESTUFF CORPORATION, OF NEW YORK, N. Y., A CORPORATION OF DELAWARE.

DYE OF THE ANTHRAQUINONE SERIES.

No Drawing. Application filed January 21, 1928, Serial No. 248,561, and in Germany January 25, 1927.

The present invention concerns new derivatives of the anthraquinone series containing nitrogen. The process for their production consists in causing ethylene diamine to react upon hydroxy-anthraquinones. New compounds of a great technical value are obtained. At the present time no definite information can be given concerning the chemical nature of the new bodies. The most feasible theory is that possibly one or more hydroxy- groups are replaced by the ethylene diamine group $NH_2-CH_2-CH_2-NH-$. The properties of the bodies produced, however, do not correspond to those to be expected in accordance with this hypothesis. While, for example, amino-anthraquinones and amino-hydroxy-anthraquinones, as well as N-alkylated derivatives of these bodies dissolve in concentrated sulfuric acid to colorless or yellow solutions, in isolated cases to yellowish-red solutions, the new compounds surprisingly dissolve in concentrated sulfuric acid with the formation of intense reddish blue to greenish blue colorations. These solutions show as a rule characteristic absorption spectra.

They can be employed as dyestuffs as such without further treatment, for example, for dyeing cellulose acetate silk. They are likewise valuable starting materials for the manufacture of other dyestuffs.

The new compounds are after being dried dark crystalline products being soluble in concentrated sulfuric acid generally with a reddish-blue to greenish-blue coloration. They dye acetate silk generally red to bluish-red shades.

The following examples will illustrate our invention:

Example 1.—2 parts by weight of powdered quinizarine are introduced into 10 volumes of ethylene diamine hydrate. The quinizarine partly dissolves with a violet coloration and soon after dark violet colored crystals separate out, representing a loose, salt-like compound of quinizarine and ethylene diamine, which is decomposed into its components by methyl alcohol. At this point cautious heating is effected to 35 to 40° C. The mass gradually changes its consistency and the precipitated crystals assume another form. When quinizarine can no longer be detected spectroscopically in an isolated test portion the whole is diluted with water, filtered and washed, the residue shaken with dilute hydrochloric acid, filtered, washed until neutral and recrystallized from pyridine and methyl alcohol. Very beautiful crystalline small needles are thus obtained, which dissolve in concentrated sulfuric acid with an intense reddish blue coloration. (1-amino-4-hydroxyanthraquinone dissolves in sulfuric acid with a yellow coloration.)

Example 2.—2 parts by weight of purpurin are introduced into 10 volumes of ethylene diamine hydrate. Also in this case orange-yellow crystals are first precipitated, which are a salt like compound of purpurin and ethylene diamine. The whole is now slowly warmed on the water-bath to 90 to 95° C., when the said crystals pass into solution, whereupon separation of long needles soon takes place. When the quantity thereof no longer increases, the solution is allowed to cool, the crystals separated are filtered off and washed with methyl alcohol. They dissolve in concentrated sulfuric acid with a blue coloration. (Purpurin amide, 1-amino-2.4-dihydroxyanthraquinone, obtained from purpurin and ammonia dissolves in sulfuric acid with a yellow coloration.)

Example 3.—2 parts by weight of 1-4-8-trihydroxyanthraquinone are introduced into 10 volumes of ethylene diamine hydrate. A violet solution is formed, which very quickly changes into a thick magma containing fine crystalline needles with spontaneous heating to 25 to 30° C.; these crystals constitute the new compound and can be isolated as described in Examples 1 or 2.

The new dyestuff crystallizes from pyridine and methyl alcohol in beautiful dark needles, which dissolve in concentrated sulfuric acid with a blue coloration, the solution exhibiting a beautiful spectrum.

The remaining compounds of this series can be produced in a similar manner from hydroxy anthraquinone and ethylene-diamine.

Some characteristic reactions of a few representatives of these bodies are compiled in the following table:

| Compound from ethylene diamine and— | Solution in conc. sulfuric acid | Spectrum of this solution | Solution in mixed boric and sulfuric acid | Spectrum of this solution |
|---|---|---|---|---|
| Quinizarine | Reddish blue. | Band in orange, band in yellow green. | Blue | About the same as without boric acid. |
| Purpurin | Reddish blue. | Similar to the quinizarine derivative. | Blue | About the same as without boric acid. |
| 1:4:8-trihydroxy-anthraquinone. | Blue | Similar to the above, but sharper. | Greenish blue. | Largely displaced towards red. |
| 1:2:4:5:8-pentahydroxyanthraquinone. | Greenish blue. | Bands in comparison with the above largely displaced towards red. | Blueish green. | Sharper than without boric acid. |

We claim:

1. In the process for the manufacture of derivatives of the anthraquinone series containing nitrogen, the step which comprises causing ethylene diamine to react upon hydroxy-anthraquinones.

2. In the process for the manufacture of derivatives of the anthraquinone series containing nitrogen, the step which comprises causing ethylene diamine to react upon quinizarine.

3. The new derivatives of the anthraquinone series containing nitrogen which can be obtained by treating hydroxyanthraquinones with ethylene diamine, which products are dark crystallized compounds soluble in concentrated sulfuric acid generally with a reddish-blue to greenish-blue coloration, dyeing acetate silk generally red to bluish-red shades.

4. The new derivative of the anthraquinone series which can be obtained by treating quinizarine with ethylene diamine, which new product crystallizes in small needles which are soluble in concentrated sulfuric acid with an intense reddish blue coloration, dyeing acetate silk blueish red shades.

In testimony whereof we have hereunto set our hands.

ROBERT EMANUEL SCHMIDT.
ROBERT BERLINER.